United States Patent [19]

Nicia

[11] Patent Number: 4,746,186
[45] Date of Patent: May 24, 1988

[54] INTEGRATED OPTICAL MULTIPLEXER/DEMULTIPLEXER UTILIZING A PLURALITY OF BLAZED GRATINGS

[75] Inventor: Antonius J. A. Nicia, Eindhoven, Netherlands

[73] Assignee: U.S. Philips Corp., New York, N.Y.

[21] Appl. No.: 94,069

[22] Filed: Aug. 31, 1987

Related U.S. Application Data

[63] Continuation of Ser. No. 675,685, Nov. 28, 1984.

[30] Foreign Application Priority Data

Dec. 15, 1983 [NL] Netherlands ........................ 8304311

[51] Int. Cl.$^4$ ............................ G02B 6/10; H04B 9/00
[52] U.S. Cl. ................ 350/96.13; 350/96.12; 350/96.16; 350/96.18; 350/96.19; 350/162.20; 350/162.22; 350/162.23; 370/1; 370/3
[58] Field of Search ............... 350/96.10, 96.11, 96.12, 350/96.13, 96.14, 96.16, 96.15, 96.17, 96.18, 96.19, 162.20, 162.21, 162.22, 162.23, 162.24, 162.11; 370/1, 3

[56] References Cited

U.S. PATENT DOCUMENTS

| | | | |
|---|---|---|---|
| 3,603,668 | 9/1971 | DeBitetto | 350/162.2 |
| 3,944,326 | 3/1976 | Tacke et al. | 350/96.19 |
| 3,970,959 | 7/1976 | Wang et al. | 350/96.19 |
| 4,330,175 | 5/1982 | Fujii et al. | 350/162.11 X |
| 4,634,215 | 1/1987 | Reule | 350/96.16 |
| 4,652,080 | 3/1987 | Carter et al. | 350/96.19 |
| 4,673,241 | 6/1987 | Nishiwaki et al. | 350/96.13 X |
| 4,696,536 | 9/1987 | Albares et al. | 350/96.19 |
| 4,703,472 | 10/1987 | Blumentritt et al. | 370/3 |

OTHER PUBLICATIONS

Tien, "Method of Forming Novel Curved-line Gratings ....", Optics Lett., vol. 1, No. 2, 8/77, pp. 64-66.
Chang, W. S. C. "Periodic Structures and Their Application in Integrated Optics", *IEEE Trans. Microwave Th. and Techniques*, vol. MTT-21, No. 12, pp. 775-785, (Dec. 1973).
Lilienhof, H. J. et al., "Grating Demultiplexers with Printed Geodesic Lenses in Glass", Tech. Digest 8th ECOC, Cannen, 1982, pp. 321-324.

*Primary Examiner*—William L. Sikes
*Assistant Examiner*—Brian M. Healy
*Attorney, Agent, or Firm*—Thomas A. Briody; Jack Haken

[57] ABSTRACT

A planar reflecting grating is described which is suitable for use in an optical multiplexer or demultiplexer. This grating comprises a periodic structure of elongated areas which are formed at constant distances from each other in a thin light-conducting layer deposited on a substrate. In their longitudinal directions, the areas have periodic ridges, corresponding ridges extending parallel to each other.

20 Claims, 1 Drawing Sheet

INTEGRATED OPTICAL MULTIPLEXER/DEMULTIPLEXER UTILIZING A PLURALITY OF BLAZED GRATINGS

This is a continuation of application Ser. No. 675,685, filed Nov. 28, 1984.

BACKGROUND OF THE INVENTION

The invention relates to a reflection grating and to an optical multiplexer or demultiplexer provided with such a grating.

Such a reflection grating is suitable for use in optical telecommunication systems equipped with light-conducting fibers. A multiplexer or demultiplexer provided with a reflection grating is used on the transmitting or receiving end of a glass fiber communication system in order to combine light beams of different wavelengths into one beam or to split one combined beam into separate beams of different wavelengths.

Alternatively, a transmission grating, such as a so-called Bragg deflector, may be employed as a beam splitting element (demultiplexer) or a beam combining element (multiplexer). However, a reflection grating has the advantage that it can be used in a so-called Littrow configuration. In this configuration, the input fiber is disposed in the immediate vicinity of the output fiber.

The article entitled "Grating demultiplexers with printed geodesic lenses in glass" by H. J. Lilienhof et al (*Techn. Digest of the 8th ECOC,* Cannes, 1982, pages 321-324) describes the use of a reflection grating in an optical demultiplxer. This demultiplexer comprises a planar geodesic lens. A planar optical element may be defined as an optical element comprising a light-conducting layer deposited on a substrate. The layer has a refractive index which differs from that of the substrate and is provided with a structure chosen to achieve a selected optical function. The structure may be a depth profile or a refractive index profile. The refractive index profile can be obtained by ion bombardment or by ion exchange in a salt solution.

A geodesic lens is a planar lens having a depression in a substrate on which a light-conducting layer of constant refractive index has been deposited. In the demultiplexer described in the Lilienhof et al article, the reflection grating is a conventional grating which is arranged against the edge of the substrate of the geodesic lens. The grating lines extend perpendicular to the plane of the thin film conductor.

The Lilienhof et al grating is not integrated with the other components of the optical circuit. Apart from the geodesic lens, the circuit also comprises input and output fibers.

The fact that the reflection grating is not integrated has several disadvantages. For example, during assembly of the optical circuit the reflection grating must be aligned accurately relative to the light-conducting fibers. Further, the components should be adjustable. Moreover, a demultiplexer with a separate grating is more bulky than and less stable than a fully integrated demultiplexer.

SUMMARY OF THE INVENTION

It is an object of the present invention to provide a reflection grating which is integrable in a planar optical circuit. According to the invention the reflecting grating comprises a double periodic structure of elongated areas (perturbations) which are spaced at a constant distance from one another in a light-conducting layer deposited on a substrate. These areas have periodic blazes in their longitudinal directions, corresponding blazes extending parallel to each other.

The invention is based on the recognition of the fact that a structure which functions as a diffraction grating may be super-imposed on a known planar reflector structure. The known reflector comprises a plurality of parallel elongated areas, as described in an article by W. S. C. Chang entitled "Periodic Structures and Their Application in Integrated Optic" (*IEEE Transactions on Microwave Theory and Techniques,* Vol. MTT-21, No. 12, December 1973, pages 775-785). As shown in FIG. 5, the two structures together operate as a planar reflection grating.

The planar reflection structure may be a surface profile in the light-conducting layer. Such a profile can be formed with the required accuracy using techniques employed for the manufacture of photomasks in integrated circuit fabrication, such as electron beam lithography.

Alternatively, the planar grating may comprise areas which have a refractive index which differs from that of the light-conducting layer. Such a structure can be obtained, for example, by ion implantation or ion exchange.

The reflection grating according to the invention is very suitable for use in an optical multiplexer or demultiplexer. This multiplexer (or demultiplexer) may comprise a planar lens which ensures that the beam which is incident on the grating is a parallel beam. However, for this purpose the elongated areas preferably have arcuate shapes, so that the reflection grating can perform the lens' function, and a separate lens is not needed.

DESCRIPTION OF THE PREFERRED EMBODIMENT

Figure 1:
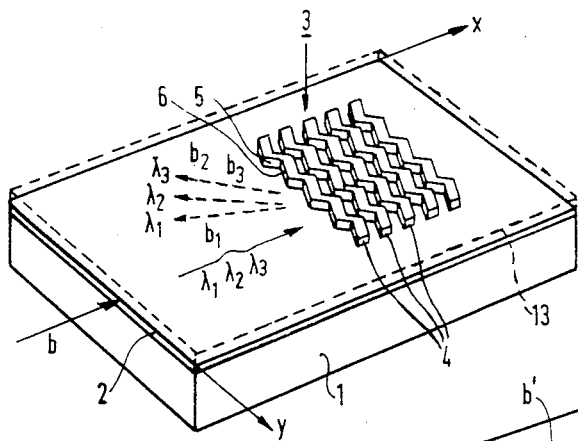
FIG. 1 is a perspective view, partly in phantom, of a planar reflection grating according to the invention.

The reflection grating shown in FIG. 1 comprises a periodic structure 3 on a thin light-conducting layer 2. Layer 2 is deposited on a substrate 1.

The substrate 1 is made of, for example, glass, a transparent plastic, a semiconductor material, or a crystal such as lithium niobate. The light conducting layer 2 is a monomode light conductor and has a thickness of approximately 1 $\mu$m. This layer 2 is made of a transparent material whose refractive index is higher than that of the substrate 1. As a result, most of the energy of radiation beam b which enters at the left will remain within the light-conducting layer 2.

The beam b in layer 2 is reflected by the reflection structure 3. If the beam b comprises a plurality of wavelength bands $\lambda_1$, $\lambda_2$, and $\lambda_3$, it is split into a plurality of sub-beams $b_1$, $b_2$ and $b_3$, each of one specific wavelength band.

Figure 2:
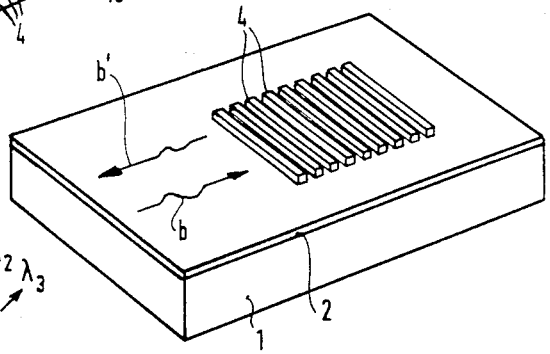
FIGS. 2 and 3 are perspective and schematic views, respectively, of the two structures of which the grating is formed.
Figure 3:

The structure 3 may be thought of as comprising the two structures shown in FIGS. 2 and 3. FIG. 2 shows a periodic structure of elongated straight areas (perturbations) 4. As described in the Chang article, such a structure functions as a reflector. Each of the elongated conductors 4 may be regarded as an element which disturbs the propagation of the radiation in the light-conducting layer, so that only part of the radiation follows its original path. The remainder is reflected or emerges from the boundary surfaces of the layer. By arranging a plurality of such elements at the corrrect distance from each other and with the correct geometry, the reflected radiation components can be arranged to augment each other, and the other components can be arranged to suppress each other, so that the sequence of elongated areas acts as a reflector. The Chang article describes how to compute the correct geometry of the periodic structure to obtain this effect.

FIG. 3 shows a known blazed reflection grating comprising grooves which extend perpendicular to the plane of the drawing. These grooves have walls 5 with negative slopes, and walls 6 with positive slopes.

A beam which is incident on this grating is split into a plurality of sub-beams, each of which propagates in a direction $\beta_m$, $\beta_m$ being defined by the grating law:

$$a. \ (\sin \alpha + \sin \beta_m) = m\lambda,$$

where $\alpha$ is the angle at which the beam is incident on the grating, m is the order number of the beam, a is the grating period, and $\lambda$ is the wavelength of the radiation. The grating may be constructed so that most of the radiation energy is contained in the first order. Within this first order with propagation direction $\beta_1$, the radiation components of different wavelengths are diffracted at different angles, as indicated by the broken line arrows in FIG. 3.

According to the invention, each elongated area 4 of FIG. 2 is given the shape shown in FIG. 3 to form the double-periodic structure 3 shown in FIG. 1. In the x-direction, a wave which propagates in the light-conducting layer 2 essentially sees the structure of FIG. 2, so that this wave is reflected. Due to the presence of the periodic structure which extends in the y-direction, and which comprises blazes with portions 5 and 6, the periodic structure 3 also behaves as a diffraction grating which splits an incident beam of different wavelengths into a plurality of beams $b_1$, $b_2$, and $b_3$. The directions of these beams depend on the wavelengths $\lambda_1$, $\lambda_2$, and $\lambda_3$. Conversely, a plurality of beams of different wavelengths which are incident on the periodic structure 3 at the correct angles will be combined into one beam of the different wavelengths. Based on existing knowledge in the field of gratings and planar period structures as described in the literature, the geometry of the double periodic structure 3 can be designed so that high reflection and diffraction efficiency are achieved.

In the embodiment shown in FIG. 1, the double periodic surface profile comprises ridges on the light-conducting layer 2.

Instead of ridges the surface profile may comprise grooves. The surface profile need not be rectangular but may alternatively have a sinusoidal shape. Such profiles can be obtained using techniques employed in integrated circuit fabrication.

Alternatively, the double periodic structure may comprise narrow strips of metal on the light-conducting layer 2. These strips behave as perturbing elements in a similar way as the ridges or the grooves.

The light-conducting layer 2 may be provided with an additional layer 13 (FIG. 1) to protect the surface profile or the metal strips.

Alternatively, the double periodic structure may be formed entirely within the light-conducting layer 2. The structure 3 then comprises areas with a refractive index which differs from that of the light-conducting layer 2. The desired refractive index variation can be obtained by ion bombardment or ion exchange.

Figure 4:
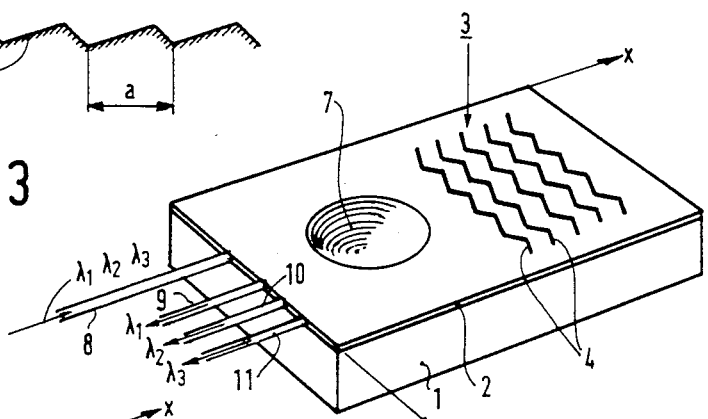
FIG. 4 is a perspective view of a first optical multiplexer (or demultiplexer) embodying the invention.

An important use of the planar reflection grating is in the field of integrated multiplexers and demultiplexers for use in conjunction with glass fibers. Such a multiplexer (or demultiplexer), which is shown in FIG. 4, may comprise a substrate 1 on which a light-conducting layer 2 has been deposited. In addition to the reflection grating shown in FIG. 1, a planar geodesic lens 7 is formed in this layer 2. An input fiber 8 is coupled to the light-conducting layer 2. The axis of the fiber coincides with a meridional axis of the geodesic lens.

The geodesic lens 7 converts the beam which diverges from the fiber 8 into a parallel beam which is incident on the planar reflection grating 3. The beam components of different wavelengths are reflected so as to be routed to the various output fibers 9, 10 and 11 via the lens 7. Conversely, beams of different wavelengths which enter the light-conducting layer 2 via the fibers 9, 10 and 11 will be combined into one beam which is directed toward the fiber 8.

The geodesic lens 7 may comprise a rotationally symmetrical recess in the substrate 1 bearing the light-conducting layer 2 of uniform thickness. Since the shape of the layer 2 changes at the location of the recess, the directions of marginal rays of the beam will change, causing the part of the layer 2 at the location of the recess to act as a lens.

Alternatively, the planer lens 7 may comprise a circular area with a refractive index which varies continuously in the radial direction.

Figure 5:
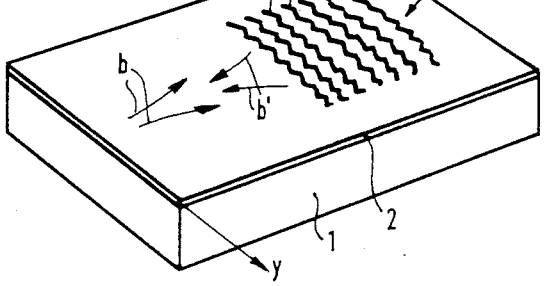
FIG. 5 is a perspective view of a second multiplexer (or demultiplexer) embodying the invention.

A particularly advantageous embodiment of a multiplexer (or demultiplexer) according to the invention is shown in FIG. 5. This multiplxer (or demultiplexer) comprises only a planar reflection grating 3'. The elongated areas 4' are now curved, so that viewed in the x-direction the grating 3' functions as a concave reflector (with lens action). This grating 3' reflects the diverging beam issuing from the fiber 8 to produce a converging reflected beam. In the same way as described with reference to FIG. 1, the periodic blazes in the elongated areas 4' diffract the reflected radiation in different directions as a function of the wavelength.

What is claimed is:
1. A reflection grating comprising:
a substrate;
a light-conducting layer on the substrate; and
a plurality of elongated perturbations extending in a direction of elongation in the light-conducting layer, said perturbations being spaced apart from each other a substantially constant distance in a longitudinal direction transverse to the direction of elongation, each perturbation having the shape of a blazed grating, portions of different blazed grating perturbations which correspond to each other in the longitudinal direction extending parallel to each other, said plurality of perturbations reflecting light in the light-conducting layer which is incident on the perturbations at a first angle of incidence, said first angle of incidence being transverse to the direction of elongation, said plurality of perturbations diffracting different wavelengths of light incident at the first angle of incidence, said different wavelengths being diffracted in different directions.

2. A reflection grating as claimed in claim 1, characterized in that the perturbations are curved in the direction of elongation.

3. A reflection grating as claimed in claim 2, characterized in that the perturbations are changes in the thickness of the light-conducting layer.

4. A reflection grating as claimed in claim 3, characterized in that the perturbations are ridges in the light-conducting layer.

5. A reflection grating as claimed in claim 3, characterized in that the perturbations are grooves in the light-conducting layer.

6. A reflection grating as claimed in claim 2, characterized in that the perturbations are metallic strips on the light-conducting layer.

7. A reflection grating as claimed in claim 2, characterized in that the perturbations are changes in the refractive index of the light-conducting layer.

8. A reflection grating as claimed in claim 2, characterized in that the grating further comprises a protective layer over the light-conducting layer.

9. A reflection grating as claimed in claim 12, characterized in that perturbations have a curvature chosen to focus light incident thereon.

10. An optical multiplexer/demultiplexer comprising:
a substrate;
a light-conducting layer on the substrate;
a planar lens in the light-conducting layer; and
a plurality of elongated perturbations extending in a direction of elongation in the light-conducting layer, said perturbations being spaced apart from the planar lens in a longitudinal direction transverse to the direction of elongation, said perturbations being spaced apart from each other a substantially constant distance in the longitudinal direction, each perturbation having the shape of a blazed grating, portions of different blazed grating perturbations which correspond to each other in the longitudinal direction extending parallel to each other, said plurality of perturbations reflecting light in the light-conducting layer which is incident on the perturbations at a first angle of incidence, said first angle of incidence being transverse to the direction of elongation, said plurality of perturbations diffracting different wavelengths of light incident at the first angle of incidence, said different wavelengths being diffracted in different directions.

11. An optical multiplexer/demultiplexer comprising:
a substrate;
a light-conducting layer on the substrate; and
a plurality of elongated perturbations extending in a direction of elongation in the light-conducting layer, said perturbations being spaced apart from each other a substantially constant distance in a longitudinal direction transverse to the direction of elongation, each perturbation having the shape of a blazed grating, portions of different blazed grating perturbations which correspond to each other in the longitudinal direction extending parallel to each other, said perturbations being curved in the direction of elongation, said plurality of perturbations reflecting light in the light-conducting layer which is incident on the perturbations at a first angle of incidence, said first angle of incidence being transverse to the direction of elongation, said plurality of perturbations diffracting different wavelengths of light incident at the first angle of incidence, said different wavelengths being diffracted in different directions.

12. An optical multiplexer/demultiplexer as claimed in claim 11, characterized in that the perturbations have a curvature chosen to focus light incident thereon.

13. A reflection grating comprising:
a substrate;
a light-conducting layer on the substrate; and
a plurality of elongated perturbations extending in a direction of elongation in the light-conducting layer, said perturbations being spaced apart from each other a substantially constant distance in a longitudinal direction transverse to the direction of elongation, each perturbation having a wavy shape, portions of different perturbations which correspond to each other in the longitudinal direction extending parallel to each other, said plurality of perturbations reflecting light in the light-conducting layer which is incident on the perturbations at a first angle of incidence, said first angle of incidence being transverse to the direction of elongation, said plurality of perturbations diffracting different wavelengths of light incident at the first angle of incidence, said different wavelengths being diffracted in different directions.

14. A reflection grating as claimed in claim 13, characterized in that the perturbations are curved in the direction of elongation.

15. A reflection grating as claimed in claim 14, characterized in that the perturbations are changes in the thickness of the light-conducting layer.

16. A reflection grating as claimed in claim 15, characterized in that the perturbations are ridges in the light-conducting layer.

17. A reflection grating as claimed in claim 15, characterized in that the perturbations are grooves in the light-conducting layer.

18. A reflection grating as claimed in claim 14, characterized in that the perturbations are metallic strips on the light-conducting layer.

19. A reflection grating as claimed in claim 14, characterized in that the perturbations are changes in the refractive index of the light-conducting layer.

20. A reflection grating as claimed in claim 14, characterized in that the perturbations have a curvature chosen to focus light incident thereon.

* * * * *